US006651246B1

(12) United States Patent
Archambault et al.

(10) Patent No.: US 6,651,246 B1
(45) Date of Patent: Nov. 18, 2003

(54) LOOP ALLOCATION FOR OPTIMIZING COMPILERS

(75) Inventors: Roch Georges Archambault, Scarborough (CA); Robert James Blainey, Newmarket (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/574,408

(22) Filed: May 18, 2000

(30) Foreign Application Priority Data

Nov. 8, 1999 (CA) .............................................. 2288614

(51) Int. Cl.[7] .............................................. G06F 9/45
(52) U.S. Cl. ...................... 717/160; 717/149; 717/150; 717/151; 717/157
(58) Field of Search .................. 717/160, 149–151, 717/154–157, 159, 126

(56) References Cited

U.S. PATENT DOCUMENTS

| 4,710,872 | A | | 12/1987 | Scarborough | |
|---|---|---|---|---|---|
| 4,782,444 | A | | 11/1988 | Munshi et al. | |
| 5,193,190 | A | | 3/1993 | Janczyn et al. | |
| 5,249,295 | A | | 9/1993 | Briggs et al. | |
| 5,396,627 | A | * | 3/1995 | Iitsuka | 717/160 |
| 5,457,799 | A | * | 10/1995 | Srivastava | 717/160 |
| 5,481,723 | A | * | 1/1996 | Harris et al. | 717/160 |
| 5,491,823 | A | * | 2/1996 | Ruttenberg | 717/161 |
| 5,634,059 | A | * | 5/1997 | Zaiki | 717/160 |
| 5,787,284 | A | * | 7/1998 | Blainey et al. | 717/144 |
| 5,802,375 | A | | 9/1998 | Ngo et al. | |
| 5,850,549 | A | * | 12/1998 | Blainey et al. | 717/156 |
| 5,887,174 | A | | 3/1999 | Simons et al. | |
| 6,058,266 | A | * | 5/2000 | Megiddo et al. | 717/156 |
| 6,059,841 | A | * | 5/2000 | Caracuzzo | 717/154 |
| 6,070,011 | A | * | 5/2000 | Liu et al. | 717/160 |
| 6,223,337 | B1 | * | 4/2001 | Blume | 717/126 |

FOREIGN PATENT DOCUMENTS

JP          03091036 A        4/1991

OTHER PUBLICATIONS

Megiddo, Nimrod and Sarkar, Vivek, "Optimal Weighted Loop Fusion for Parallel Programs", ACM 19976, p. 282–291, retrieved Dec. 2, 2002 from the ACM database.*
Sha,Edwin H.–M and Lang, Chenhau and Passos, Nelson, "Polynomial–Time Nested Loop Fusion with Full Parallelism", IEEE 1996, retrieved from the IEE database Dec. 2, 2002.*

(List continued on next page.)

Primary Examiner—Gregory Morse
Assistant Examiner—Mary Steelman
(74) Attorney, Agent, or Firm—Scully, Scott, Murphy & Presser; Richard M. Ludwin

(57) ABSTRACT

Loop allocation for optimizing compilers includes the generation of a program dependence graph for a source code segment. Control dependence graph representations of the nested loops, from innermost to outermost, are generated and data dependence graph representations are generated for each level of nested loop as constrained by the control dependence graph. An interference graph is generated with the nodes of the data dependence graph. Weights are generated for the edges of the interference graph reflecting the affinity between statements represented by the nodes joined by the edges. Nodes in the interference graph are given weights reflecting resource usage by the statements associated with the nodes. The interference graph is partitioned using a profitability test based on the weights of edges and nodes and on a correctness test based on the reachability of nodes in the data dependence graph. Code is emitted based on the partitioned interference graph.

33 Claims, 3 Drawing Sheets

OTHER PUBLICATIONS

Aho, Alfred V., Sethi, Ravi, Ullman, Jeffrey D., "Compilers Principles, Techniques, and Tools", Addison Wesley Longman, 1986 Bell Telephone Laboratories, Inc., Chapters 5, 8, 9, and 10.*

B. Hsieh, et al., "Loop Distribution With Multiple Exits", Proceedings of IEEE Supercomputing '92, Minneapolis, Minn., Nov. 1992.

"A Conversion Technique for Optimized Parallel Loop in Multiprocessor Systems", pp. 1–12, including English language abstract.

"Program Optimization With Ideograph", by S. ShouHan Wang, et al., International Conference on Parallel Pro Issue, Vol. 2, 1989, pp. 153–159.

"A Framework for Selective Recompilation in the Presence of Complex Intermodule Dependencies", by Craig Chambers, et al., $17^{th}$ International Conference on Software 1995, pp. 221–230.

"Value Dependence Graphs: Representation without Taxation", by Daniel Weise, et al., Microsoft Corp. $21^{st}$ ACM Sigplan–Sigact SYMPOS, 1994, pp. 297–310.

"Optimal Time and Efficient Space Free Scheduling for Nested Loops", by Nectarios Koziris, et al., Computer Journal Oxford University Press for British Comp., vol. 39, No. 5, 1996, pp. 439–448.

"Models and Scheduling Algorithms for Mixed Data and Task Parallel Programs", by Soumen Chakrabarti, et al., Journal of Parallel and Distributed Computing Issue, vol. 47, No. 2, Dec. 1997, pp. 168–184.

"Register Allocation with Instruction SCH", by S. S. Pinter, Journal of Programming Languages Issue, vol. 4, No. 1, Mar. 1996, pp. 21–28.

"Efficient Data Flow Analysis Package", by J. D. Rutledge, IBM Technical Disclosure Bulletin, vol. 24, No. 2, Jul. 1981, pp. 1139–1143.

"Automatic Parallelization of Loops in Sequential Code", by A. S. Munshi, et al., IBM Technical Disclosure Bulletin, vol. 30, No. 2, Jul. 1987, pp. 731–735.

"An algorithm for Elimination of Forward Dependences in Parallel Loops", by Zdzisaw Szczerbishi, Proceedings of the $2^{nd}$ International Conf. Issue, vol. 2, 1997, pp., 398–407.

"Dependence Analysis for Subscripted Variables and Its Application to Program Transformations", by John Randal Allen, a Thesis submitted in partial fulfillment of the requirements for the Degree Doctor of Philosophy, Apr. 1983, pp. 1–181.

"Automatic Translation of FORTRAN Programs to Vector Form", by Randy Allen, et al., ACM Transactions on Programming Languages and Systems, vol. 9, No. 4, Oct. 1987, pp. 491–542.

"Dependence Analysis for Supercomputing", by Utpal Banerjee, Kluwer Academic Publishers, 1988, pp. 1–155.

"A Global Approach to Detection of Parallelism", by Charles David Callahan, II, Thesis Submitted in Partial Fulfillment of the Requirements for the Degree Doctor of Philosophy, 1987; pp. 1–157.

"Automatic Parallelization for Symmetric Shared–Memory Multiprocessors", by Jyh–Herng chow, et al., Application Development Technology Institute, IBM Software Solutions Division, pp. 76–89.

"The Program Dependence Graph and Its Use in Optimization", by Jeanne Ferrante, et al., ACM Transactions on Programming Languages and Systems, vol. 9, No. 3, Jul. 1987, pp. 319–349.

"21 On Estimating and Enhancing Cache Effectiveness", by J. Ferrante, et al., IBM Research Division, pp. 328–343.

"18 Collective Loop Fusion for Array Contraction", by G. Gao, et al, $5^{th}$ International Workshop, Aug. 1992, pp. 280–295.

"Stream Processing", by Allen Goldberg, et al., 1984 ACM 0–89791–142–3/84/008/0053, pp. 53–62.

"Optimization Subroutine Library", IBM Guide and Reference, Release 2.1, Fifth Edition, 1995, pp. 37, 59, 78–87, 119, 151–152, 197–221, 307, 315–317, 342–344, 338–391, 530–538, 561–563, 568–592 and 760–763.

"Supernode Partitioning", by F. Irigoin, et al., 1988 ACM–0–89791–252–7/88/001/0319, pp. 319–329.

"Maximizing Loop Parallelism and Improving Data Locality via Loop Fusion and Distribution", by Ken Kennedy, et al., Center for Research on Parallel Computation, a NSF Science and Technology Center, pp. 301–320.

"Typed Fusion with Applications to Parallel and Sequential Code Generation", by Ken Kennedy, et al., Center for Research on Parallel Computation, a NSF Science and Technology Center, pp. 1–7.

"Fortran 90 Explained", by Michael Metcalf, et al., Oxford Science Publications, pp. 64–71, 105–123 and 173.

"Integer and Combinatorial Optimization", by George L. Nemhauser, et al., A Wiley–Interscience Publication, pp. 1–5, 205–258.

"Determining Average Program Execution Times and their Variance", by Vivek Sarkar, 1989 ACM 0–89791–306–X/ 89/0006/0298; pp. 298–312.

"Partitioning and Scheduling Parallel Programs for Multiprocessors", by Vivek Sarkar, Research Monographs in Parallel and Distributed Computing, The MIT Press, pp. 1–200.

"Automatic partitioning of a program dependence graph into parallel tasks", by V. Sarkar, IBM J. Res. Develop. vol. 35, No. 5/6, Sep./Nov. 1991, pp. 779–804.

"Automatic selection of high–order transformations in the IBM XL FORTRAN compilers", by V. Sarkar, IBM J. Res. Develop., vol. 41, No. 3, May 1997, pp. 233–264.

"A General Framework for Iteration–Reordering Loop Transformations (Technical Summary)", by Vivek Sarkar, et al., ACM SIGPLAN '92 PLDI–6/92/CA, pp. 175–187.

"An HPF Compiler for IBM SP2", by Manish Gupta, et al., Fifth Workshop on Compilers for parallel Computers, Jun. 1995, pp. (see Table of Contents on page 2).

"A Loop Transformation Theory and an Algorithm to Maximize Parallelism", by Michael E. Wolf, et al, IEEE Transactions on Parallel and Distributed Systems, vol. 2, No. 4, Oct. 1991, pp. 452–471.

"Optimizing Supercompilers for Supercomputers", by Michael Wolfe, Research Monographs in Parallel and Distributed Computing, The MIT Press, pp. 1–166.

"Vector Register Allocation", by Randy Allen, IEEE Transactions on computers, vol. 41, No. 10, Oct. 1992, pp. 1290–1317.

"Improving Register Allocation for Subscripted Variables", by David Callahan, et al., ACM SIGPLAN '90 Conference on Programming Language Design and Implementation, vol. 25, No. 6, Jun. 1990, pp. 53–65.

"Dependence Graphs and Compiler Optimizations", by D. J. Kuck, et al., ACM Conference Record of the Eighth Annual ACM Symposium on Principles of Programming Languages, Jan. 1981, pp. 206–218.

"Optimization of Array Accesses by Collective Loop Transformations", by Vivek Sarkar, et al., 1991 ACM 0–89791–434–1/91/0006/0194, pp. 194–205.

"PTRAN—THE IBM Parallel Translation System", by Vivek Sarkar, pp. 309–391.

"A Hierarchical Basis for Reordering Transformations", by Joe Warren, 1983 ACM 0–89791–125–3/84/001/0272, pp. 272–282.

* cited by examiner

LOOP ALLOCATION FOR OPTIMIZING COMPILERS

BACKGROUND OF THE INVENTION

1. Technical Field

The present invention is directed to an improvement in computing systems and in particular to computer systems which provide for optimized loop code generation in the compilation of computer programs.

2. Prior Art

Optimizing compilers permit efficient object code to be emitted given a particular piece of source code to be compiled. Source code which includes loops is typically the subject of optimization in compilers. For a given segment of source code containing loops and for a given target machine micro architecture, cache geometry and parallel processing capability, the loop allocation of an optimizing compiler will be used to attempt to determine a collection of object code loop nests which will give efficient execution at an acceptable compilation-time cost.

Loop allocation optimization found in known compilers typically relies upon a set of ordered loop allocation transformations, as well as optimizations for data locality and parallelism. For example, loop source code may be optimized by emitting source code which minimizes off-chip access when the loop object code is executed. Another optimization for loop source code is to emit object code which may be executed in parallel by a multi-processor machine.

Typically, prior art optimizing compilers which carry out loop allocation include loop distribution early in the set of transformations, followed by parallelism and data locality transformations and finish with loop fusion and array contraction as a cleanup phase.

In prior art optimizing compilers, nested loops are optimized on a loop-by-loop basis. A prior art approach to optimizing sibling loops is to merge such nests. This approach is described by Sarkar, V. and Gao, G. R., "Optimization of Array Accesses by Collective Loop Transformations," $5^{th}$ International Conference on Supercomputing, Cologne, Germany, June 1991, pp. 194–205.

This prior art approach involves a profitability and correctness test for the merger of the sibling loops. The optimization determines first if fusion of the sibling loops is desirable (a profitability analysis). Another prior art approach to loop optimization is to first distribute the loop code, to then optimize the distributed code and then to fuse the code after optimization.

Each of the above approaches to optimization involves optimizations of the loop code independent of, or following, loop distribution steps. Where nested loops are optimized on a loop-by-loop basis, optimizing which may be possible due to relationships between code in different nested loops may be missed. Similarly, where the loop code is distributed, optimized and then fused, the optimization is carried out on distributed portions of the code and interrelationships between those sections of code may not be considered in the optimization.

It is therefore desirable to have a computer system which carries out the loop allocation in an optimized compiler without accomplishing the loop distribution step at an early point in the sequence of loop transformations.

SUMMARY OF THE INVENTION

According to one aspect of the present invention, there is provided an improved system for the optimization of loop code compilation.

According to another aspect of the present invention, there is provided a computer program product for compilation of a source code segment. The computer program product has instruction means to generate a program dependence graph for the source code segment. The program dependence graph includes a control dependence graph and a data dependence graph. Each of the control dependence graph and the data dependence graph have nodes, each node in the data dependence graph is associated with one or more statements in the source code segment. There is also instruction means to generate an interference graph from the data dependence graph, with instruction means for deriving nodes for the interference graph from the nodes in the data dependence graph. The nodes in the interference graph are thereby each associated with one or more statements in the source code segment. There is instruction means for generating a node weight for each node in the interference graph, each node having a node weight reflecting the resource usage for the one or more statements associated with the node.

There is also instruction means for generating edges for the interference graph, each edge connecting a pair of nodes in the interference graph, with instruction means for generating an associated edge weight for each edge reflecting the desirability of maintaining the one or more statements associated with each of the pair of nodes connected by the edge within the same loop. There is also provided instruction means for partitioning the interference graph into subgraphs based on the edge weights and the node weights of the interference graph, and instruction means for emitting code conforming to the partitioned interference graph.

According to another aspect of the present invention, there is provided the above computer program product in which the instruction means for partitioning the interference graph comprises instruction means for first conducting a profitability test to select a pair of nodes in the interference graph, instruction means for then conducting a correctness test on the selected pair, and instruction means for merging the selected pair of nodes into a coalesced node where the correctness test is satisfied for the selected pair.

According to another aspect of the present invention, there is provided the above computer program product in which the instruction means for conducting a profitability test comprises instruction means for selecting the pair of nodes in the interference graph having the highest associated edge weight, the selected pair of nodes having a sum of node weights lower than a pre-defined resource limit for a target machine for the compiler.

According to another aspect of the present invention, there is provided the above computer program product in which the instruction means for conducting a correctness test comprises instruction means for comparing the selected pair of nodes in the interference graph with nodes in the interference graph corresponding to nodes in the data dependence graph defined to be reachable by the data dependence graph from those nodes in the data dependence graph reachable from the nodes in the data dependence graph corresponding to the selected pair of nodes in the interference graph.

According to another aspect of the present invention, there is provided the above computer program product in which the instruction means for comparing nodes comprises instruction means for defining a test set by generating a merged reachability set by taking the union of the nodes reachable from the selected pair of nodes, and removing the selected pair of nodes, and taking the union of the nodes reachable from the merged reachability set, and comparing the intersection of the test set with the union of the pair of selected nodes with the null set.

According to another aspect of the present invention, there is provided the above computer program product in which each node in the interference graph has an associated reachability vector representing which nodes in the interference graph are reachable from the node and in which set operations to determine reachability of nodes are carried out using the reachability vectors.

According to another aspect of the present invention, there is provided the above computer program product in which the instruction means for generating a program dependence graph comprises instruction means for ordering the generation of the program dependence graph from an innermost level of nested loops in the source code segment to an outermost level of nested loops in the source code segment.

According to another aspect of the present invention, there is provided the above computer program product in which the instruction means for generating a program dependence graph comprises instruction means for generating the control dependence graph for a level of nested loops in the source code segment and for then generating corresponding nodes for the data dependence graph for the said level of nested loops, the corresponding nodes in the data dependence graph being defined by constraints determined from the control dependence graph.

According to another aspect of the present invention, there is provided the above computer program product in which the instruction means for generating a program dependence graph comprises instruction means for determining pi blocks in the segment of source code and in which pi blocks are maintained in the generation of the program dependence graph from an inner level of nested loops to a parent level of nested loops in the source code segment.

According to another aspect of the present invention, there is provided the above computer program product in which the means for emitting code comprises instruction means for generating optimized object code including one or more techniques selected from the set of techniques comprising scalar expansion, usage of temporary storage, array contraction, and strip mining.

According to another aspect of the present invention, there is provided the above computer program product in which the -instruction means for emitting code comprises means for generating optimized object code by optimizing for parallelism and for data locality.

According to another aspect of the present invention, there is provided a method for compiling a source code segment, the method comprising the following steps:
1. generating a program dependence graph for the source code segment, the program dependence graph comprising a control dependence graph and a data dependence graph, each of the control dependence graph and the data dependence graph comprising nodes, each node in the data dependence graph being associated with one or more statements in the source code segment,
2. causing a computer to generate an interference graph from the data dependence graph, by deriving nodes for the interference graph from the nodes in the data dependence graph, the nodes in the interference graph thereby each being associated with one or more statements in the source code segment and
generating a node weight for each node in the interference graph, each node having a node weight reflecting the resource usage for the one or more statements associated with the node, generating edges for the interference graph, each edge connecting a pair of nodes in the interference graph, generating an associated edge weight for each edge reflecting the desirability of maintaining the one or more statements associated with each of the pair of nodes connected by the edge within the same loop,
3. partitioning the interference graph into subgraphs based on the edge weights and the node weights of the interference graph, and
4. emitting code conforming to the partitioned interference graph.

According to another aspect of the present invention, there is provided the above method in which the step of partitioning the interference graph comprises the steps of
1. conducting a profitability test to select a pair of nodes in the interference graph,
2. conducting a correctness test on the selected pair, and
3. merging the selected pair of nodes into a coalesced node where the correctness test is satisfied for the selected pair.

According to another aspect of the present invention, there is provided the above method in which the step of conducting the profitability test comprises selecting the pair of nodes in the interference graph having the highest associated edge weight, the selected pair of nodes having a sum of node weights lower than a pre-defined resource limit for a target machine for the compiler.

According to another aspect of the present invention, there is provided the above method in which conducting a correctness test comprises the steps of comparing the selected pair of nodes in the interference graph with nodes in the interference graph corresponding to nodes in the data dependence graph defined to be reachable by the data dependence graph from those nodes in the data dependence graph reachable from the nodes in the data dependence graph corresponding to the selected pair of nodes in the interference graph.

According to another aspect of the present invention, there is provided a computer program product tangibly embodying a program of instructions executable by a computer to perform the above method steps.

According to another aspect of the present invention, there is provided a system for compilation of a source code segment. The system has means to generate a program dependence graph for the source code segment. The program dependence graph includes a control dependence graph and a data dependence graph. Each of the control dependence graph and the data dependence graph have nodes, each node in the data dependence graph is associated with one or more statements in the source code segment. There is also means to generate an interference graph from the data dependence graph, with means for deriving nodes for the interference graph from the nodes in the data dependence graph. The nodes in the interference graph are thereby each associated with one or more statements in the source code segment. There is means for generating a node weight for each node in the interference graph, each node having a node weight reflecting the resource usage for the one or more statements associated with the node. There is also means for generating edges for the interference graph, each edge connecting a pair of nodes in the interference graph, with means for generating an associated edge weight for each edge reflecting the desirability of maintaining the one or more statements associated with each of the pair of nodes connected by the edge within the same loop. There is also provided means for partitioning the interference graph into subgraphs based on the edge weights and the node weights of the interference graph, and means for emitting code conforming to the partitioned interference graph.

According to another aspect of the present invention, there is provided the above system in which the means for partitioning the interference graph comprises means for first conducting a profitability test to select a pair of nodes in the interference graph, means for then conducting a correctness test on the selected pair, and means for merging the selected pair of nodes into a coalesced node where the correctness test is satisfied for the selected pair.

According to another aspect of the present invention, there is provided the above system in which the means for conducting a profitability test comprises means for selecting the pair of nodes in the interference graph having the highest associated edge weight, the selected pair of nodes having a sum of node weights lower than a pre-defined resource limit for a target machine for the compiler.

According to another aspect of the present invention, there is provided the above system in which the means for conducting a correctness test comprises means for comparing the selected pair of nodes in the interference graph with nodes in the interference graph corresponding to nodes in the data dependence graph defined to be reachable by the data dependence graph from those nodes in the data dependence graph reachable from the nodes in the data dependence graph corresponding to the selected pair of nodes in the interference graph.

According to another aspect of the present invention, there is provided the above system in which the means for comparing nodes comprises means for defining a test set by generating a merged reachability set by taking the union of the nodes reachable from the selected pair of nodes, and removing the selected pair of nodes, and taking the union of the nodes reachable from the merged reachability set, and comparing the intersection of the test set with the union of the pair of selected nodes with the null set.

According to another aspect of the present invention, there is provided the above system in which each node in the interference graph has an associated reachability vector representing which nodes in the interference graph are reachable from the node and in which set operations to determine reachability of nodes are carried out using the reachability vectors.

Advantages of the present invention include improvements in optimization across loops and nests of loops. In addition, the manipulation of graph representations of the code permits application of known heuristic-based graph partitioning techniques to the loop allocation compilation.

BRIEF DESCRIPTION OF THE DRAWINGS

Preferred embodiments of the present invention will now be described, by way of example only, with reference to the accompanying drawings in which.

Figure 1:
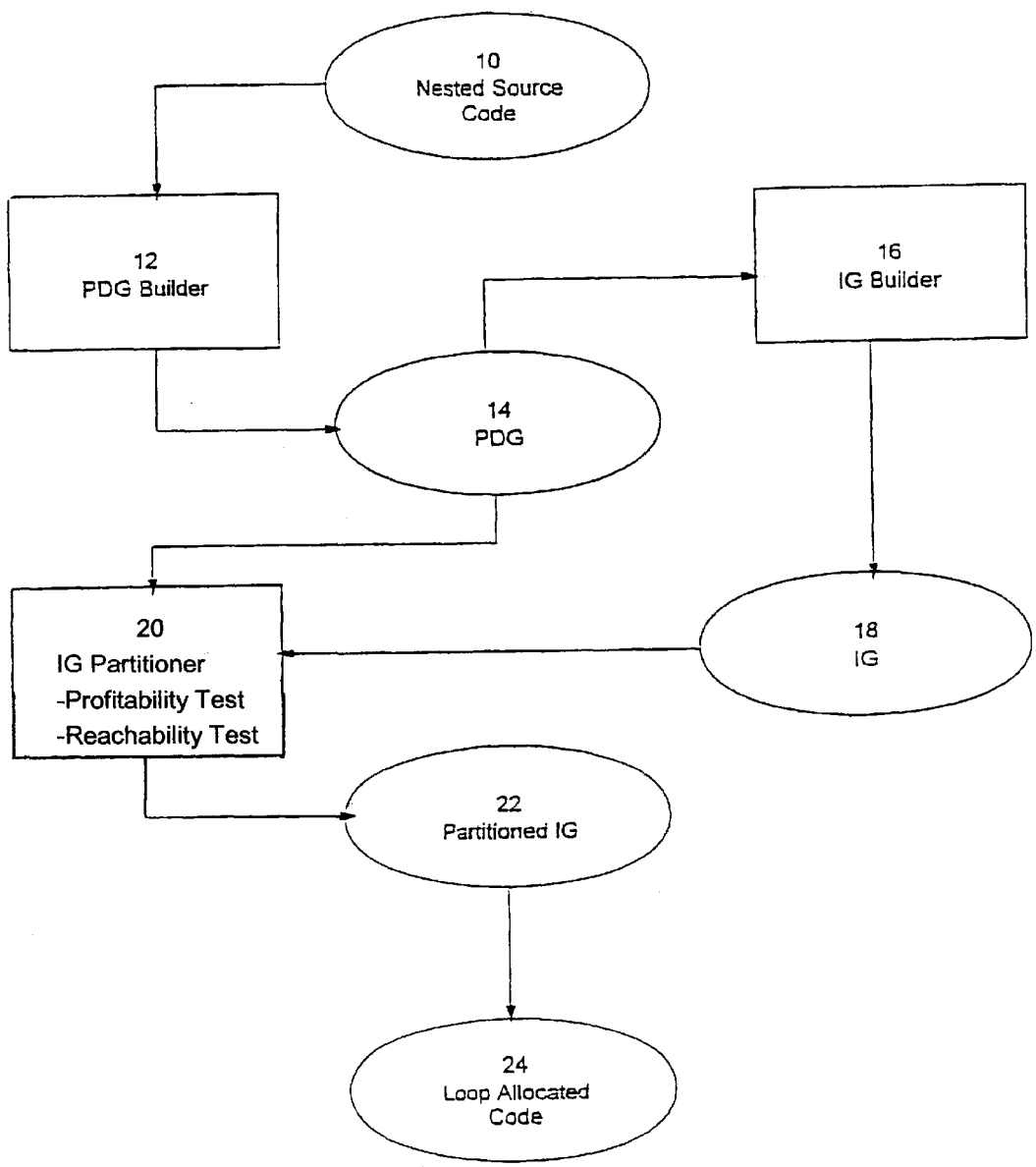
FIG. 1 is a block diagram illustrating the process flow of the optimizing compiler of the preferred embodiment.

In the drawings, the preferred embodiment of the invention is illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENTS OF THE INVENTION

The system of the preferred embodiment is illustrated in FIG. 1 which shows the flow of the loop allocation of the preferred embodiment in a block schematic diagram. Nested source code 10 is used by PDG (program dependence graph) builder 12 to create the program dependence graph shown as PDG 14. An interference graph (IG) is then created by IG builder 16 and is shown in FIG. 1 as IG 18. The next step in the loop allocation of the preferred embodiment is IG partitioning 20 which takes as input both PDG 14 and IG 18 to create partitioned IG 22. This last partitioned graph, shown in FIG. 1 as partitioned IG 22 is used to define loop allocated code 24.

As is described in more detail below, approaching loop allocation in an optimizing compiler by using the transformation ordering of the preferred embodiment results in natural optimization within and across loop nests. As the description of the preferred embodiment sets out, the preferred embodiment accomplishes an early maximal loop fusion. The compiler of the preferred embodiment also incorporates known techniques for generating optimized object code. These include scalar expansion, usage of temporary storage including registers (through the application of temporary vector allocation), array contraction and stripmining. In the preferred embodiment, these techniques are used before transformations for parallelism and data locality are performed. The description set out below does not describe such techniques in detail as they are known to those skilled in the art and may be utilized in conjunction with the loop allocation of the preferred embodiment as will be understood by those skilled in the art.

As indicated in FIG. 1, the loop allocation of the preferred embodiment creates PDG 14 from nested source code 10. PDG builder 12 starts with the innermost nested loop and moves outwards. The construction of such a PDG is known in the art and is described, for example, in Ferrante, J., Ottenstein, K. and Warren, J., "The program dependence graph and its use in optimization," ACM Trans. Program. Lang. Syst., 1987, pp. 319–349. Although referred to as a single graph, there are two components to a program dependence graph such as PDG 14 shown in FIG. 1: a control dependence graph (CDG) and a data dependence graph (DDG). In the CDG, the nodes are defined to be blocks of code (branch-free segments of the code) and edges are ordering constraints for the blocks (for example, evaluation of conditions) . In the DDG, the nodes are individual statements (or as set out below, aggregate statements specified by the CDG) and the edges are data dependencies (flow dependence, anti-dependence and output dependence).

A program dependence graph (PDG) represents semantic information for a source code segment and is used in optimizing compilers to determine whether a transformation involving a reordering of code is permissible. In the preferred embodiment, the CDG for a given PDG (or portion of PDG) is generated first. Because the CDG defines required control dependencies, the CDG is used to create aggregate blocks of statements in nodes in the DDG. Where the CDG requires that statements are maintained together, they are included together in the nodes of the DDG.

The PDG is calculated starting at the innermost nest of loops in the code to be represented by the PDG. The PDG computes" πblocks which are subgraphs of the DDG in which each node is reachable from each other node (strongly connected regions). In the generation of the PDG, " πblocks are contributed up to the next level of the graph, when the parent loop is being processed. Once the top level of the PDG is created, then a partitioning, or interference, graph is built, as is described below. As is shown in FIG. 1, once PDG-14 is created for source code 10, the interference graph IG 18 is created by IG builder 16. The graph of IG 18 is induced from the nodes of the DDG of PDG 14. The interference graph takes the nodes from the DDG of PDG 14, but not the edges. Thus IG 14 has nodes corresponding to the statements of nested source code 10. IG 18 is an undirected graph (the edges of the graph have no direction). Edges for IG 18 are created by IG builder 166 by giving a weight for each edge between nodes based on the desirability of keeping the two statements (or blocks of statements), represented by the two nodes at the ends of the edge, in the same loop. In addition, each node in IG 18 is given a weight by IG builder 16. This weight is determined by a heuristic in IG builder 16 which determines the resources used by the statement corresponding to the node in IG 18. For example, the number of linear streams in memory, or the number of registers used by the statement will affect the weight given to the node for that statement in IG 18, as determined by the heuristic of IG builder 16, for the given target machine.

An example of the determination of the weight for an edge between two nodes in IG 18 is shown for the following two statements:

$A(i)=B(i)+C(i)$ $D(i)=B(i)+E(i)$

Because B(i) is a data stream shared by the two statements there will be an affinity between the two statements (there will be efficiencies achieved by keeping the two statements in the same loop) and the weight of the edge between the two nodes representing the two statements will be adjusted by IG builder 16, accordingly. Other factors will be apparent to those skilled in the art as being relevant to the weights accorded to the edges in IG 18. For example, complimentary use of execution resources such as the balanced use of different pipelines in a target machine, may be included by IG builder 16 in determining the edge E2 weights in IG 18.

As is shown in FIG. 1, the nodes of IG 18 are then partitioned, or merged, into super nodes in partitioned IG 22. This is also referred to as a coalescing of nodes in IG 18. It will be apparent to those skilled in the art that partitioned IG 22 may be implemented as a modified IG 18, rather than a separate data structure, as is shown in the block diagram of FIG. 1.

Figure 2:
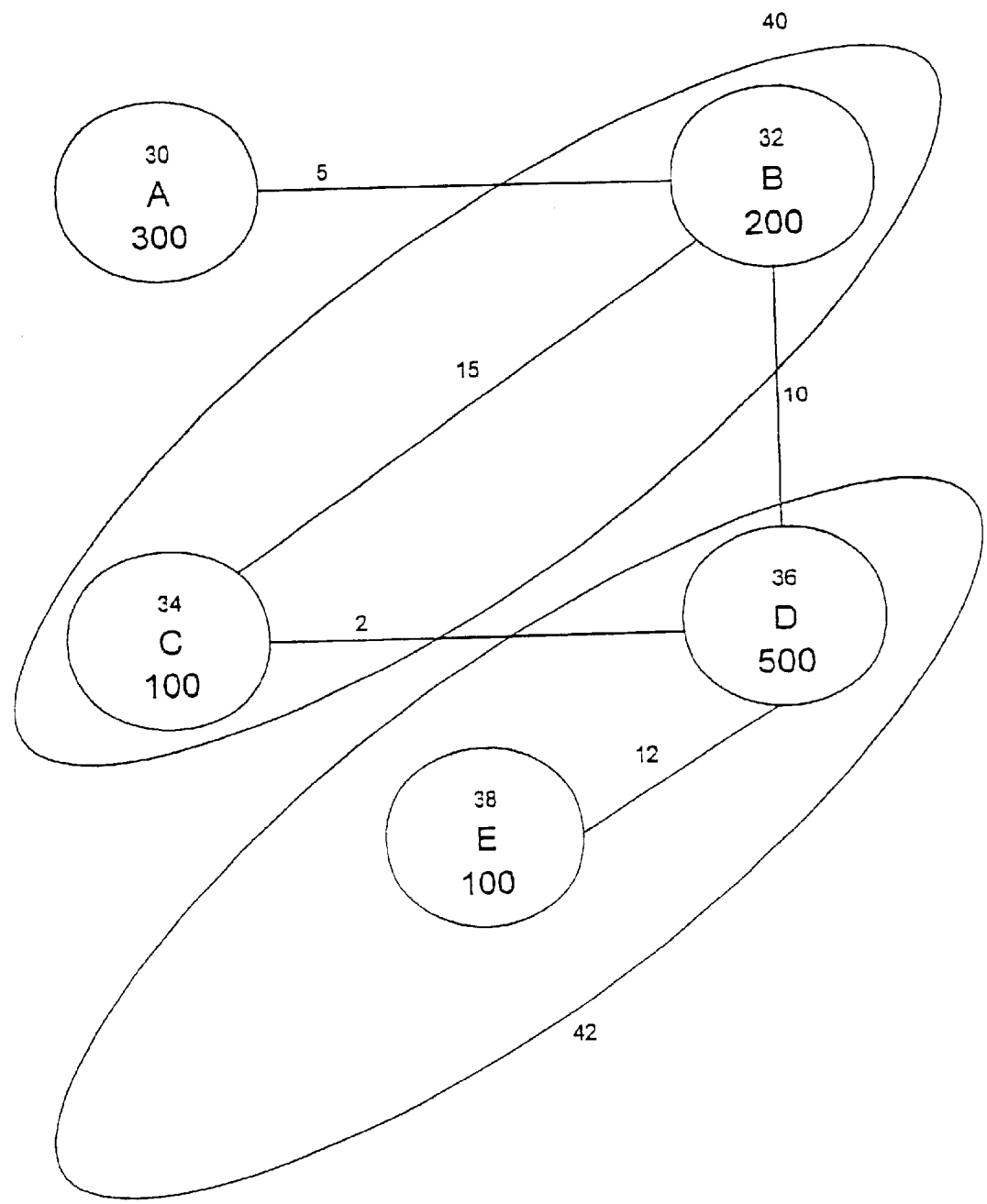
FIG. 2 is a graph diagram illustrating an example partitioned interference graph as generated by the preferred embodiment.

FIG. 2 is a graph diagram showing an example interference graph which has been partitioned or merged into a partitioned interference graph (as shown in FIG. 1 as partitioned interference graph 22). The interference graph of FIG. 2 has nodes 30, 32, 34, 36, 38 which correspond to statements A, B, C, D, E respectively. The interference graph in FIG. 2 has weights assigned to the edges between nodes 30, 32 (a weight of 5), between nodes 32, 34 (15), between nodes 32, 36 (10), between nodes 34, 36 (2) and between nodes 36, 38 (12). In addition, each of the nodes has been assigned a weight (for example 300 for node 30). The graph of FIG. 2 is partitioned by selecting the edges of the graph in order of their relative weights. In the example of FIG. 2, the nodes 32, 34 have the edge between them with the highest weight (15). The graph is therefore partitioned to create a merged node 40 comprising nodes 32,34. The next partition is performed on nodes 36, 38, which share an edge with the next highest weight, to create supernode 42.

The partitioning of an interference graph in the compiler of the preferred embodiment also includes a calculation based on the combination of the node weights in the merged node. For a given target machine, the loop allocation of the preferred embodiment has a specified resource limit or limits. This is reflected in a weight (which may be implemented as a vector of weights) which is used as a limit in the merging or coalescing of nodes into supernodes in the interference graph.

The resource limit for a merged node will be used to determine the desirability of merging two nodes which have been identified as candidates for merger due to the affinity weight found on the edge between the two nodes in the interference graph. If the resource limit is exceeded by the merged node'[__]s weight then the merge is not desirable. The resource limit is therefore used in a profitability test for the merger of nodes in the graph. Thus even where there is an affinity for statements being kept in the same loop, the profitability test encompasses a check to determine if keeping the statements in the same loop will result in the resource limit being exceeded for the target machine.

In the example of FIG. 2, the supernode 42 has a merged weight of 600. If the resource limit for the target machine is 550, for example, supernode 42 will not be created.

The edge affinity weight and the resource limit test for merger of nodes in the interference graph are measures of the profitability of merging the nodes in the graph. This is a mechanism for determining whether the statements represented by the nodes in the graph are to be kept in the same loop in the emitted code. If the profitability test is passed, the next test carried out in the loop allocation of the preferred embodiment is to determine the correctness of the merger of the nodes.

In the preferred embodiment, the correctness test for the merger of two nodes is carried out by reference to the reachability of the nodes in the DDG. The DDG is a directed graph and may be used to determine whether the merger of the nodes will violate any of the constraints which are reflected in the DDG. The reachability of the nodes in the DDG reflects constraints on ordering of the statements which are subject to the proposed merger in the interference graph.

Figure 3:
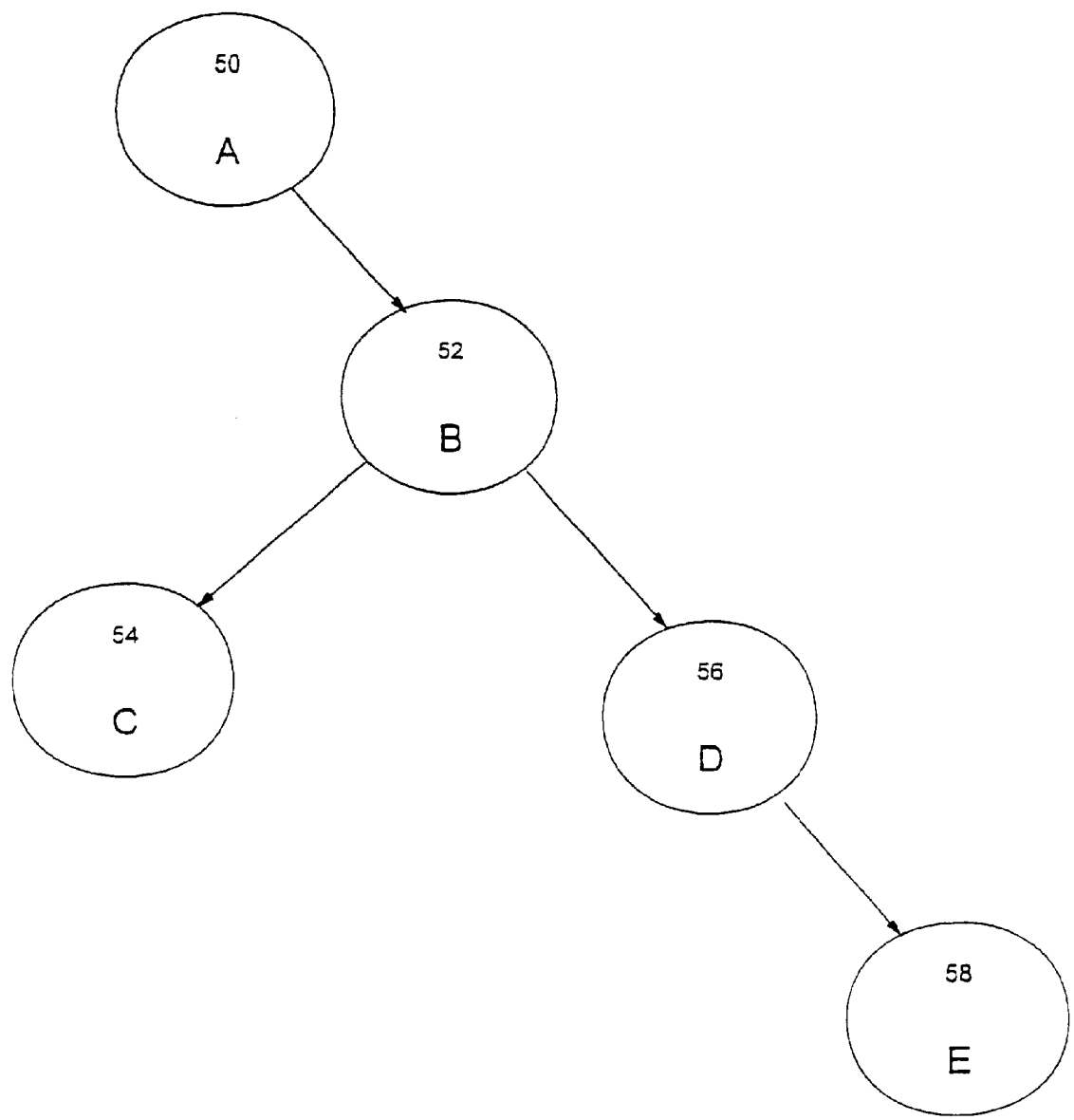
FIG. 3 is a graph diagram illustrating an example data dependence graph as generated by the preferred embodiment.

The calculation of reachability is carried out in the preferred embodiment by determining a reachability bit vector for each node in the DDG. An example DDG is shown in the graph of FIG. 3. Nodes 50, 52, 54, 56, 58 in FIG. 3 represent statements A, B, C, D, E, respectively. The universe for the bit vector is therefore the set A, B, C, D, E. The reachability of node 52 (statement B) is the set B, C, D, E, in the example of FIG. 3. The reachability bit vector for a selected node is a bit vector which has five bits, each bit corresponding to the reachability of the corresponding node in the graph from the selected node. For example, the reachability bit vector for node 52 is (0 ,1, 1, 1, 1), representing the fact that node 52 (statement B) reaches nodes 52, 54, 56, 58, but not node 50 (in terms of statements, it reaches statements B, C, D, E, but not A).

Using a bit vector to represent the reachability of nodes in the DDG permits operations to be carried out on the bit vectors in a single operation for each of the 32 nodes in the graph for many implementing computers. For example, a 32-bit machine is capable of storing a DDG reachability bit vector for a graph of up to 32 nodes in a single word.

The correctness test for merging two subgraphs in an interference graph may be described using the following steps, where R(n) is the set of nodes reachable from node n in the DDG:

Let G1 and G2 be two subgraphs of the interference graph $$\text{Let } S=(R(G1)[\_]U\ R(G2))\ .\ (G1[\_]UG2)$$

$$\text{Let } T=[\_]U\ R(i) \text{ (the union over i in S:R(i))}_{i\in S[i\notin S]}$$

The merger will be correct if $T \cap [\acute{e}] (G1[\_U\ G2))==\theta[\_]$. The above steps will determine whether the proposed merger will result in a violation of the constraint of the DDG by determining whether the proposed merger (G1[\_]U G2) will result in nodes reachable by the merged node (set S) reaching some node in the merged set (G1[\_]U G2). Because reachability in the DDG is an indication of a semantic constraint that the statement of a reachable node follow a statement of a given node, if $T \cap [\acute{e}] (G1\ [\_]U\ G2)$ is not null, the merged node will result in statements being constrained to both precede and follow the merged node, a contradictory conclusion which indicates that the constraints of the DDG are violated by the proposed merged supernode (or subgraph).

After the partitioning or coalescing of subgraphs, the reachability vectors are updated as follows:

$$GNEW=G1]\_U\ G2 \text{(where } G1 \text{ and } G2 \text{ are coalesced.)}$$

$$R(GNEW)=R(G1)[\_]U\ R(G2)$$

For each other subgraph D, $$\text{if } R(D) \cap [\acute{e}](G1[\_]U\ G2)!=\emptyset[\_],$$

then $$R(D)=R(D)[\_]U\ R(GNEW)$$

The above operations are carried out by the preferred embodiment to ensure that the reachability vectors are maintained correctly following the partitioning of the interference graph. As is described above, the use of reachability vectors provides a correctness test which defines whether a merger of nodes in the interference graph which has been identified as profitable is in fact permitted by the constraints represented in the DDG.

Following the graph partitioning set out above, the optimizing compiler of the preferred embodiment uses known techniques to emit optimized code, such as scalar expansion, usage of temporary storage, array contraction and stripmining. The generation of both the PDG and the interference graph for a given segment of source code, and then the coalescing of subgraphs in the interference graph permit the optimization to occur across loops and nests of loops. In addition, the manipulation of graph representations of the code permits application of known heuristic-based graph partitioning techniques to the loop allocation compilation.

The detailed descriptions may have been presented in terms of program procedures executed on a computer or network of computers. These procedural descriptions and representations are the means used by those skilled in the art to most effectively convey the substance of their work to others skilled in the art. They may be implemented in hardware or software, or a combination of the two.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, objects, attributes or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices.

Each step of the method may be executed on any general computer, such as a mainframe computer, personal computer or the like and pursuant to-one or more, or a part of one or more, program modules or objects generated from any programming language, such as C++, Java, Fortran or the like. And still further, each step, or a file or object or the like implementing each step, may be executed by special purpose hardware or a circuit module designed for that purpose.

In the case of diagrams depicted herein, they are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

The invention may be implemented as an article of manufacture comprising a computer usable medium having computer readable program code means therein for executing the method steps of the invention, a program storage device readable by a machine, tangibly embodying a program of instructions executable by a machine to perform the method steps of the invention, or a computer program product. Such an article of manufacture, program storage device or computer program product may include, but is not limited to, CD-ROMs, diskettes, tapes, hard drives, computer RAM or ROM and/or the electronic, magnetic, optical, biological or other similar embodiment of the program. Indeed, the article of manufacture, program storage device or computer program product may include any solid or fluid transmission medium, magnetic or optical, or the like, for storing or transmitting signals readable by a machine for controlling the operation of a general or special purpose programmable computer according to the method of the invention and/or to structure its components in accordance with a system of the invention.

The invention may also be implemented in a system. A system may comprise a computer that includes a processor and a memory device and optionally, a storage device, an output device such as a video display and/or an input device such as a keyboard or computer mouse. Moreover, a system may comprise an interconnected network of computers. Computers may equally be in stand-alone form (such as the traditional desktop personal computer) or integrated into another apparatus (such a cellular telephone). The system may be specially constructed for the required purposes to perform, for example, the method steps of the invention or it may comprise one or more general purpose computers as selectively activated or reconfigured by a computer program in accordance with the teachings herein stored in the computer(s). The procedures presented herein are not inherently related to a particular computer system or other apparatus. The required structure for a variety of these systems will appear from the description given.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. A computer program product for compilation of a source code segment, said computer program product comprising:

instruction means to generate a program dependence graph for the source code segment, the program dependence graph comprising a control dependence graph and a data dependence graph, each of the control dependence graph and the data dependence graph comprising nodes, each node in the data dependence graph being associated with one or more statements in the source code segment, instruction means to generate an interference graph from the data dependence graph, comprising instruction means for deriving nodes for the interference graph from the nodes in the data dependence graph, the nodes in the interference graph thereby each being associated with one or more statements in the source code segment, instruction means for generating a node weight for each node in the interference graph, each node having a node weight reflecting the resources used by the one or more statements associated with the node, instruction means for generating edges for the interference graph, each edge connecting a pair of nodes in the interference graph, instruction means for generating an associated edge weight for each edge reflecting the desirability of maintaining the one or more statements associated with each node of the pair of nodes connected by the edge within the same loop, instruction means for partitioning the interference graph into subgraphs based on the edge weights and the node weights of the interference graph, and instruction means for emitting code conforming to the partitioned interference graph.

2. The computer program product of claim 1 in which the instruction means for partitioning the interference graph comprises instruction means for first conducting a profitability test to select a pair of nodes in the interference graph, instruction means for then conducting a correctness test on the selected pair, and instruction means for merging the selected pair of nodes into a coalesced node where the correctness test is satisfied for the selected pair.

3. The computer program product of claim 2 in which the instruction means for conducting a profitability test comprises instruction means for selecting the pair of nodes in the interference graph having the highest associated edge weight, the selected pair of nodes having a sum of node weights lower than a pre-defined resource limit for a target machine for the compiler.

4. The computer program product of claim 2 in which the instruction means for conducting a correctness test comprises instruction means for comparing the selected pair of nodes in the interference graph with nodes in the interference graph corresponding to nodes in the data dependence graph defined to be reachable by the data dependence graph from those nodes in the data dependence graph reachable from the nodes in the data dependence graph corresponding to the selected pair of nodes in the interference graph.

5. The computer program product of claim 4 in which the instruction means for comparing nodes comprises instruction means for defining a test set by generating a merged reachability set by taking the union of the nodes reachable from the selected pair of nodes, and removing the selected pair of nodes, and taking the union of the nodes reachable from the merged reachability set, and comparing the intersection of the test set with the union of the pair of selected nodes with the null set.

6. The computer program product of claim 5 in which each node in the interference graph has an associated reachability vector representing which nodes in the interference graph are reachable from the node and in which set operations to determine reachability of nodes are carried out using the reachability vectors.

7. The computer program product of claim 6 in which the instruction means for generating a program dependence graph comprises instruction means for generating the control dependence graph for a level of nested loops in the source code segment and for then generating corresponding nodes for the data dependence graph for the said level of nested loops, the corresponding nodes in the data dependence graph being defined by constraints determined from the control dependence graph.

8. The computer program product of claim 1 in which the instruction means for generating a program dependence graph comprises instruction means for ordering the generation of the program dependence graph from an innermost level of nested loops in the source code segment to an outermost level of nested loops in the source code segment.

9. The computer program product of claim 8 in which the instruction means for generating a program dependence graph comprises instruction means for determining pi blocks in the segment of source code and in which pi blocks are maintained in the generation of the program dependence graph from an inner level of nested loops to a parent level of nested loops in the source code segment.

10. The computer program product of claim 9 in which the instruction means for emitting code comprises means for generating optimized object code by optimizing for parallelism and for data locality.

11. The computer program product of claim 1 in which the means for emitting code comprises instruction means for generating optimized object code including one or more techniques selected from the set of techniques comprising scalar expansion, usage of temporary storage, array contraction, and strip mining.

12. A loop allocation optimizing compiler comprising, means for generating a program dependence graph for a source code segment, the program dependence graph comprising a control dependence graph and a data dependence graph, each of the control dependence graph and the data dependence graph comprising nodes, each node in the data dependence graph being associated with one or more statements in the source code segment, means for generating an interference graph from the data dependence graph, comprising means for deriving nodes for the interference graph from the nodes in the data dependence graph, the nodes in the interference graph thereby each being associated with one or more statements in the source code segment, means for generating a node weight for each node in the interference graph, each node having a node weight reflecting the resources used by the one or more statements associated with the node, means for generating edges for the interference graph, each edge connecting a pair of nodes in the interference graph, means for generating an associated edge weight for each edge reflecting the desirability of maintaining the one or more statements associated with each node of the pair of nodes connected by the edge within the same loop, means for partitioning the interference graph into subgraphs based on the edge weights and the node weights of the interference graph, comprising means for first conducting a profitability test to select a pair of nodes in the interference graph, means for then conducting a correctness test on the selected pair, and means for merging the selected pair of nodes into a coalesced node where the correctness test is satisfied for the selected pair, and means for emitting code conforming to the partitioned interference graph.

13. The compiler of claim 12 in which the means for conducting a profitability test comprises means for selecting the pair of nodes in the interference graph having the highest associated edge weight, the selected pair of nodes having a sum of node weights lower than a pre-defined resource limit for a target machine for the compiler.

14. The compiler of claim 12 in which the means for conducting a correctness test comprises means for comparing the selected pair of nodes in the interference graph with nodes in the interference graph corresponding to nodes in the data dependence graph defined to be reachable by the data dependence graph from those nodes in the data dependence graph reachable from the nodes in the data dependence graph corresponding to the selected pair of nodes in the interference graph.

15. The compiler of claim 12 in which the means for generating a program dependence graph comprises means for ordering the generation of the program dependence graph from an innermost level of nested loops in the source code segment to an outermost level of nested loops in the source code segment.

16. The compiler system of claim 15 in which the means for generating a program dependence graph comprises means for generating the control dependence graph for a level of nested loops in the source code segment and for then generating corresponding nodes for the data dependence graph for the said level of nested loops, the corresponding nodes in the data dependence graph being defined by constraints determined from the control dependence graph.

17. A method for compiling a source code segment, the method comprising the following steps: generating a program dependence graph for the source code segment, the program dependence graph comprising a control dependence graph and a data dependence graph, each of the control dependence graph and the data dependence graph comprising nodes, each node in the data dependence graph being associated with one or more statements in the source code segment, causing a computer to generate an interference graph from the data dependence graph, by deriving nodes for the interference graph from the nodes in the data dependence graph, the nodes in the interference graph thereby each being associated with one or more statements in the source code segment and generating a node weight for each node in the interference graph, each node having a node weight reflecting the resources used by the one or more statements associated with the node, generating edges for the interference graph, each edge connecting a pair of nodes in the interference graph, generating an associated edge weight for each edge reflecting the desirability of maintaining the one or more statements associated with each node of the pair of nodes connected by the edge within the same loop, partitioning the interference graph into subgraphs based on the edge weights and the node weights of the interference graph, and emitting code conforming to the partitioned interference graph.

18. The method of claim 17 in which the step of partitioning the interference graph comprises the steps of conducting a profitability test to select a pair of nodes in the interference graph, conducting a correctness test on the selected pair, merging the selected pair of nodes into a coalesced node where the correctness test is satisfied for the selected pair.

19. The method of claim 18 in which the step of conducting the profitability test comprises selecting the pair of nodes in the interference graph having the highest associated edge weight, the selected pair of nodes having a sum of node weights lower than a pre-defined resource limit for a target machine for the compiler.

20. The method of claim 18 in which conducting a correctness test comprises the steps of comparing the selected pair of nodes in the interference graph with nodes in the interference graph corresponding to nodes in the data dependence graph defined to be reachable by the data dependence graph from those nodes in the data dependence graph reachable from the nodes in the data dependence graph corresponding to the selected pair of nodes in the interference graph.

21. The method of claim 20 in which the step of comparing nodes comprises the steps of defining a test set by generating a merged reachability set by taking the union of the nodes reachable from the selected pair of nodes, and removing the selected pair of nodes, and taking the union of the nodes reachable from the merged reachability set, and comparing the intersection of the test set with the union of the pair of selected nodes with the null set.

22. The method of claim 17 in which the step of generating a program dependence graph comprises the steps of generating the program dependence graph from an innermost level of nested loops in the source code segment to an outermost level of nested loops in the source code segment.

23. The method of claim 22 in which the step of generating a program dependence graph comprises the steps of generating the control dependence graph for a level of nested loops in the source code segment and then generating corresponding nodes for the data dependence graph for the said level of nested loops, the corresponding nodes in the data dependence graph being defined by constraints determined from the control dependence graph.

24. The method of claim 23 in which the step of generating a program dependence graph comprises the steps of determining pi blocks in the segment of source code and maintaining pi blocks in the generation of the program dependence graph from an inner level of nested loops to a parent level of nested loops in the source code segment.

25. The method of claim 17 in which the step of emitting code comprises the steps of generating optimized object code by applying one or more techniques selected from the set of techniques comprising scalar expansion, usage of temporary storage, array contraction, and strip mining.

26. The method of claim 17 in which the step of emitting code comprises the steps of generating optimized object code by optimizing for parallelism and for data locality.

27. A computer program product tangibly embodying a program of instructions executable by a computer to perform the method steps of claim 17.

28. A system for compilation of a source code segment, comprising: means to generate a program dependence graph for the source code segment, the program dependence graph comprising a control dependence graph and a data dependence graph, each of the control dependence graph and the data dependence graph comprising nodes, each node in the data dependence graph being associated with one or more statements in the source code segment, means to generate an interference graph from the data dependence graph, comprising means for deriving nodes for the interference graph from the nodes in the data dependence graph, the nodes in the interference graph thereby each being associated with one or more statements in the source code segment, means for generating a node weight for each node in the interference graph, each node having a node weight reflecting the resources used by the one or more statements associated with the node, means for generating edges for the interference graph, each edge connecting a pair of nodes in the interference graph, means for generating an associated edge weight for each edge reflecting the desirability of maintaining the one or more statements associated with each node of the pair of nodes connected by the edge within the same loop means for partitioning the interference graph into subgraphs based on the edge weights and the node weights of the interference graph, and means for emitting code conforming to the partitioned interference graph.

29. The system of claim 28 in which the means for partitioning the interference graph comprises means for first conducting a profitability test to select a pair of nodes in the interference graph, means for then conducting a correctness test on the selected pair, and means for merging the selected pair of nodes into a coalesced node where the correctness test is satisfied for the selected pair.

30. The system of claim 29 in which the means for conducting a profitability test comprises means for selecting the pair of nodes in the interference graph having the highest associated edge weight, the selected pair of nodes having a sum of node weights lower than a pre-defined resource limit for a target machine for the compiler.

31. The system of claim 29 in which the means for conducting a correctness test comprises means for comparing the selected pair of nodes in the interference graph with nodes in the interference graph corresponding to nodes in the data dependence graph defined to be reachable by the data dependence graph from those nodes in the data dependence graph reachable from the nodes in the data dependence graph corresponding to the selected pair of nodes in the interference graph.

32. The system of claim 31 in which the means for comparing nodes comprises means for defining a test set by generating a merged reachability set by taking the union of the nodes reachable from the selected pair of nodes, and removing the selected pair of nodes, and taking the union of the nodes reachable from the merge reachability set, and comparing the intersection of the test set with the union of the pair of selected nodes with the null set.

33. The system of claim 32 in which each node in the interference graph has an associated reachability vector representing which set nodes in the interference graph are reachable from the node and in which set operations to determine reachability of nodes are carried out using the reachability vetors.

* * * * *